3,689,355
FLAME-RESISTANT CARPET BACKING

Edwin D. Hornbaker and Bryan Sparks, Baton Rouge, La., and Harold D. Orloff, Oak Park, Mich., assignors to Ethyl Corporation, New York, N.Y.
No Drawing. Filed Mar. 1, 1971, Ser. No. 119,866
Int. Cl. B32b 5/20, 25/02; C08d 9/08
U.S. Cl. 161—92                                16 Claims

ABSTRACT OF THE DISCLOSURE

A composition containing from about 5 to about 75 percent by weight on a dry basis of poly(vinyl bromide) in a rubber latex. The composition is particularly useful in producing flame-resistant foam backings for sheet material.

BACKGROUND OF THE INVENTION

The present invention relates to flame-resistant backing materials, and more particularly to rubber carpet backing materials. The invention provides a novel rubber carpet backing which is extremely resistant to burning and which is self-extinguishing.

The term carpet as used herein refers to a textile fabric, both natural and synthetic, for soft floor covering. The most common types of carpeting used at the present time comprise a fabric base with erect yarn tufts extending upwardly from the base and constituting the pile. Various methods are known for constructing the base and securing the pile yarns to it.

Carpets of this type often are laid on a floor over an underlay pad which may be a foam rubber product. It is also known to use a foamed rubber obtained by foaming a rubber latex and adhering the latex to the carpet. Latex foam may be applied to the primary backing to adhere the pile yarns. Theoretically, this can eliminate the need for a secondary backing and an underlay material.

Most carpet backings are made from rubbery polymer latexes. The most commonly used rubber latex being one of styrene-butadiene rubber commonly called SBR latex. SBR latex provides a strong, flexible, resilient and durable foamed rubber carpet backing. However, these carpet backings suffer from the disadvantage of being highly flammable. SBR latexes may be formulated with various clays and fillers incorporated therin which somewhat reduce flammability, but the carpet backings obtained from which formulations still remain substantially flammable. It is therefore highly desirable that the flammability of carpet backings made from rubber latexes, particularly from an SBR latex, be reduced.

It is an object of the present invention to provide a rubber backing material having substantially reduced flammability.

THE INVENTION

In accordance with the present invention, about 5 to about 75 percent by weight dry basis poly(vinyl bromide) is incorporated in a rubber latex formulation to incrase the flame resistance of the formulation when used as a backing material.

The rubber latex which is foamed to make the backing material comprises a polymeric compound dispersed in the form of small particles in a liquid, usually water. The preferred polymeric compounds are vulcanizable rubbers, including natural rubber and various synthetic rubbers. Suitable synthetic rubbers include elastomeric homopolymers of conjugated dienes such as isoprene, butadiene, 2-chlorobutadiene and their copolymers with each other of which various monoethylenically unsaturated monomers such as styrene and acrylonitrile. Especially useful are copolymers of styrene and butadiene, known as SBR and containing about 10 to about 40 percent by weight styrene and 90 to 60 percent by weight butadiene, as well as natural rubber, which is polyisoprene. Mixtures of such rubbers also may be used.

These polymers are used in the form of a latex which is a stabilized dispersion of fine polymer particles in water. Typical dispersions contain about 35 to 65 percent by weight rubber solids. The latex also may contain any conventional additives for foam rubber latex. These include vulcanizing agents such as sulphur, accelerators, gel-inducing agents, tack-reducing agents, inert fillers, antioxidants, dispersing agents, pigments and the like.

Typical formulations suitable for use in the present invention contain the following materials.

|  | Parts dry, by weight |
|---|---|
| Part A: |  |
| Cold SBR latex | 0–100 |
| Natural latex | 0–100 |
| Stabilizer soap | 1–5 |
| Antioxidant | 1–3 |
| Inert filler | 0–200 |
| Part B: |  |
| Zinc diethyl dithiocarbamate | 0.5–2.0 |
| Zinc mercaptobenzo thiazole | 0.5–2.0 |
| Sulfur | 1.5–3.0 |
| KOH | 0.0–0.4 |
| Zinc oxide | 3.0–6.0 |
| Amine sensitizer | 0.0–2.0 |
| Gelant | 1.0–5.0 |

As is known, there are two basically different techniques for producing foam from a rubber latex. In one technique, a gas liberating compound is added to the latex which is capable of releasing gas through chemical action when heated. After the latex is deposited at the foaming site, it is heated to cause the foam to gel and, if necessary, to activate the gas liberating compound. During gelation, the separate rubber particles join together to form a closed or open cell foamed rubber product. If the gas liberating compound is heat activated, it should be selected to decompose at a temperature below the gel temperature of the latex; this will permit the latex to froth up and the bubbles thus formed to be trapped by the gelled rubber. After gelation, the rubber is cured by further heating. Typical gelation temperatures useful in preparing the products of the present invention are from about 25 to about 121° C. and typical cure temperatures are from about 121 to about 165° C.

The second method of foaming involves mechanically agitating the latex while gas, e.g., air, is introduced to form a froth. The latex may be chilled to favor trapping small bubbles. After foaming, the latex is extruded, gelled and cured as described above.

Both of these methods are well known to those skilled in the art, and therefore it is unnecessary to describe operating conditions in detail. Further information may be found in standard textbook and in U.S. Pat No. 3,496,055.

The carpet backing of the present invention contains from about 5 percent to about 75 percent by weight poly (vinyl bromide). A more preferred range is from about 20 percent to about 60 percent.

The poly(vinyl bromide) component may be added in dry form or in latex form. The particle size of the dry poly(vinyl bromide) may range from about 1 to about 200 microns and is preferably from about 5 to about 150 microns. The poly(vinyl bromide) in latex form may contain from about 10 to about 65 percent by weight solids or more preferably from about 30 to about 55 percent by weight solids.

The latex of poly(vinyl bromide) is a stabilized dispersion of fine polymer particles in water. The latex may also contain conventional additives such as plasticizers, stabilizers, pigments, colorants, thickening agents, antioxidants, and UV stabilizers.

The rubber latex composition of the present invention is prepared by mixing either the dry poly(vinyl bromide) resin or poly(vinyl bromide) latex with the rubber latex. The rubber latex composition is then foamed as described above and applied to the carpet. The following examples illustrate the invention. All parts and percentages are by weight, unless otherwise indicated.

Example I

A latex mixture was prepared containing the following ingredients:

| Ingredient | Weight (g.) | Parts by weight (dry basis) |
|---|---|---|
| Firestone SBR Latex 2003 | 166.6 | 100 |
| Calcium carbonate | 20.0 | 20 |
| Kaolin clay | 20.0 | 20 |
| Stearic acid | 3.0 | 3 |
| Sulfur | 2.0 | 2 |
| Zinc oxide | 3.0 | 3 |

The mixture was coated to a depth of 0.25 inch on a 9-inch square of nylon carpet having a polypropylene backing. The treated carpet was dried at 55° C. in an air-circulating oven.

For the flammability test, a methenamine timed burning tablet was placed in the center of the carpet backing and ignited. The sample was completely consumed by the flame.

Example II

Example I was repeated except that 150.0 g. of poly(vinyl bromide) latex (41.7 percent solids) were added to the formulation. A hole measuring 0.5 inch in diameter was burned in the carpet backing by the methenamine tablet.

Example III

A latex mixture was prepared containing the following ingredients:

| Ingredient | Weight (g.) | Parts by weight (dry basis) |
|---|---|---|
| Firestone SBR Latex 2003 | 166.6 | 100 |
| Calcium carbonate | 10.0 | 10 |
| Kaolin clay | 10.0 | 10 |
| Stearic acid | 3.0 | 3 |
| Sulfur | 2.0 | 2 |
| Zinc oxide | 3.0 | 3 |

The mixture was coated to a depth of 0.25 inch on a 9-inch square of nylon carpet having a polypropylene backing. The treated carpet was dried at 55° C. in an air-circulating oven.

For the flammability test, a methenamine timed burning tablet was placed in the center of the carpet face and ignited. The sample was completely consumed by the flame.

Example IV

Example III was repeated except that 80.0 g. of plasticized poly(vinyl bromide) latex (prepared by adding a mixture containing 12.0 g. of sodium dodecylbenzene sulfonate in 200 g. of tricresyl phosphate to 1000 g. of a poly(vinyl bromide latex) containing 41.7 percent solids) were added to the formulation. A hole measuring 1.5 inches in diameter was burned in the carpet face by the methenamine tablet.

Example V

A latex mixture was prepared containing the following ingredients:

| Ingredient | Weight (g.) | Parts by weight (dry basis) |
|---|---|---|
| Firestone SBR Latex 2003 | 166.6 | 100 |
| Poly(vinyl bromide) resin | 65.0 | 65 |
| Calcium carbonate | 20.0 | 20 |
| Kaolin clay | 20.0 | 20 |
| Stearic acid | 3.0 | 3 |
| Sulfur | 2.0 | 2 |
| Zinc oxide | 3.0 | 3 |
| Water | 85.0 | |

The mixture was coated to a depth of 0.25 inch on a 9-inch square of nylon carpet having a polypropylene backing. The treated carpet was dried at 55° C. in an air-circulating oven.

For the flammability test, a methenamine timed burning tablet was placed in the center of the carpet backing and ignited. A hole measuring 0.5 inch in diameter was burned in the carpet backing.

While the compositions of the present invention have been described with particular reference to use as flame-resistant carpet backings, it is understood that the compositions are equally suitable for use as flame-resistant foam backings for other woven materials. For example, the compositions may be used as backings for woven material intended for use as furniture upholstery coverings, automobile interior trim, such as door panels, and headliners. They may be applied to the back of natural and synthetic woven fiber fabrics, and to the back of calendered or extruded flexible thermoplastic sheet material as cushioning material.

While there has been described what is at present considered preferred embodiments of the present invention, it will be apparent to those skilled in the art that various modifications and changes may be made without departing from the essence of the invention. It is intended to cover herein all such modifications as come within the true spirit and scope of the following claims.

What is claimed is.

1. A rubber latex containing from about 5 to about 75 percent by weight, dry basis, poly(vinyl bromide).

2. The composition of claim 1 wherein said rubber latex is selected from the group consisting of natural rubber and synthetic rubber.

3. The composition of claim 1 wherein said rubber latex is a copolymer of styrene and butadiene.

4. The composition of claim 3 wherein said copolymer contains from about 10 to about 40 percent by weight styrene with the remainder being selected from the group consisting of butadiene, polyisoprene, and mixtures thereof.

5. The composition of claim 1 wherein said poly(vinyl bromide) is dry poly(vinyl bromide) having a particle size range of from about 1 to about 200 microns.

6. The composition of claim 1 wherein said poly(vinyl bromide) latex contains about 10 to about 65 percent by weight solids.

7. A foam backed carpet fabric comprising a textile carpet layer and a foamed rubber layer, said foamed rubber layer containing from about 5 to about 75 percent by weight, dry basis, poly(vinyl bromide).

8. The composition of claim 7 wherein said rubber latex is selected from the group consisting of natural rubber and synthetic rubber.

9. The composition of claim 7 wherein said rubber latex is a copolymer of styrene and butadiene.

10. The composition of claim 7 wherein said poly(vinyl bromide) is dry poly(vinyl bromide) having a particle size range of from about 1 to about 200 microns.

11. The composition of claim 7 wherein said poly(vinyl bromide) latex contains from about 10 to about 65 percent by weight solids.

12. A woven fabric material having a rubber backing, said backing containing from about 5 to about 75 percent by weight, dry basis, poly(vinyl bromide).

13. The woven fabric of claim 12 wherein said woven fabric is a synthetic fabric.

14. The woven fabric of claim 12 wherein said fabric is a natural fabric.

15. A thermoplastic sheet material having a rubber backing, said backing containing from about 5 to about 75 percent by weight, dry basis, poly(vinyl bromide).

16. The sheet material of claim 15 wherein said rubber backing is a copolymer of styrene and butadiene.

References Cited

UNITED STATES PATENTS 2,880,182  3/1959  Weissert _____ 260—2.5

FOREIGN PATENTS 975,970  11/1964  Great Britain _____ 260—Dig. 24

WILLIAM J. VAN BALEN, Primary Examiner

U.S. Cl. X.R.

161—159, 160, 162, 403; 260—4 R, 29.7 UA, 890, Digest 24